(12) United States Patent
Yamane et al.

(10) Patent No.: US 7,668,568 B2
(45) Date of Patent: Feb. 23, 2010

(54) DATA INPUT AND OUTPUT DEVICE, DATA INPUT AND OUTPUT METHOD, DATA TRANSFER METHOD, AND COMPUTER PROGRAM PRODUCT

(75) Inventors: Yasushi Yamane, Osaka (JP); Takashi Ikemori, Osaka (JP); Katsuyuki Miyazaki, Osaka (JP); Yukiko Okawa, Osaka (JP)

(73) Assignee: Fujitsu Limited, Kawasaki (JP)

( * ) Notice: Subject to any disclaimer, the term of this patent is extended or adjusted under 35 U.S.C. 154(b) by 626 days.

(21) Appl. No.: 11/637,191

(22) Filed: Dec. 12, 2006

(65) Prior Publication Data

US 2007/0135077 A1    Jun. 14, 2007

(30) Foreign Application Priority Data

Dec. 14, 2005   (JP)   ............................. 2005-360328

(51) Int. Cl.
*H04M 1/00* (2006.01)
(52) U.S. Cl. .................. 455/557; 455/558; 455/559
(58) Field of Classification Search .................. 455/557, 455/558, 556.1, 550.1, 559, 575.1; 439/629, 439/630, 631, 632
See application file for complete search history.

(56) References Cited

U.S. PATENT DOCUMENTS

| | | | | |
|---|---|---|---|---|
| 7,025,637 | B1 * | 4/2006 | Lee | 439/638 |
| 7,033,223 | B1 * | 4/2006 | Lin | 439/630 |
| 7,052,295 | B1 * | 5/2006 | Lin | 439/159 |
| 7,094,106 | B2 * | 8/2006 | Yamamoto et al. | 439/630 |
| 7,172,464 | B1 * | 2/2007 | Lee | 439/630 |
| 7,320,622 | B2 * | 1/2008 | Ying et al. | 439/630 |
| 7,392,946 | B2 * | 7/2008 | Hellstrom et al. | 235/441 |

FOREIGN PATENT DOCUMENTS

JP   2002-359694   12/2002

* cited by examiner

*Primary Examiner*—Sonny Trinh
(74) *Attorney, Agent, or Firm*—Staas & Halsey LLP

(57) ABSTRACT

A data management device body is provided with a connector to be inserted into a slot for miniSD of a mobile phone terminal. Besides, the data management device body includes a virtual memory management portion that simulates a storage area for miniSD in a hard disk drive having a capacity larger than that of the miniSD, a data write processing portion for writing data sent from the mobile phone terminal via the connector into a virtual memory that is a simulated storage area, and a data read processing portion for sending the data stored in the virtual memory to the mobile phone terminal via the connector.

6 Claims, 10 Drawing Sheets

FRONT SURFACE

REAR SURFACE

— TERMINALS

— SYSTEM LSI, ETC.

FIG. 5      PRIOR ART

| PIN NUMBER | TERMINAL NAME | FUNCTION |
|---|---|---|
| 1 | CD/DAT3 | CARD DETECTION, DATA I/O |
| 2 | CMD | COMMAND |
| 3 | VSS1 | GROUND |
| 4 | VDD | POWER SOURCE |
| 5 | CLK | CLOCK |
| 6 | VSS2 | GROUND |
| 7 | DAT0 | DATA I/O |
| 8 | DAT1 | DATA I/O |
| 9 | DAT2 | DATA I/O |

COMPANY A  X-123

| FIELD NAME | FIELD SIZE (BYTE) | DATA TYPE |
|---|---:|---|
| MEMORY NUMBER | 8 | integer |
| NAME | 40 | text |
| TELEPHONE NUMBER 1 | 20 | text |
| TELEPHONE NUMBER 2 | 20 | text |
| ELECTRONIC MAIL ADDRESS 1 | 100 | text |
| ELECTRONIC MAIL ADDRESS 2 | 100 | text |
| ADDRESS | 100 | text |
| ⋮ | ⋮ | ⋮ |

DATA INPUT AND OUTPUT DEVICE, DATA INPUT AND OUTPUT METHOD, DATA TRANSFER METHOD, AND COMPUTER PROGRAM PRODUCT

BACKGROUND OF THE INVENTION

1. Field of the Invention

The present invention relates to a device and method for inputting and outputting data to and from a device such as a mobile phone terminal including an interface for a semiconductor memory, and others.

2. Description of the Related Art

Mobile phone terminals have recently been equipped with a high-definition digital camera, a digital audio player for reproducing high-quality music and others. Besides, the number of addresses that can be registered in an address book (a phone book) of mobile phone terminals increases dramatically. Along with such evolution, data having a size larger than ever before is handled in mobile phone terminals.

Further, mobile phone terminals have been equipped with an interface for coupling a large capacity semiconductor memory. In addition, the capacity of an internal memory has been increased. This allows a backup of a large amount of data in a semiconductor memory, for example, image data of an image photographed by a digital camera of a mobile phone terminal, image data sent from other mobile phone terminal, data in an address book or music data.

Thus, since functions of mobile phone terminals are improving day by day, many users replace mobile phone terminals with new ones once in a few years. On this occasion, if an old mobile phone terminal has data to be used continuously in a new mobile phone terminal, it is necessary to transfer such data from the old mobile phone terminal to the new mobile phone terminal.

In regard to this matter, putting a method described in Japanese unexamined patent publication No. 2002-359694 to practical use is possible. According to the method, a mobile phone terminal and a personal computer are connected to each other via a USB cable. Then, data stored in the mobile phone terminal can be outputted to the personal computer and be saved therein. This method is applied as follows: An old mobile phone terminal and a personal computer are connected to each other and data stored in the old mobile phone terminal is transferred to the personal computer once. Then, a new mobile phone terminal and the personal computer are connected to each other and the data that has been backed up is transferred to the new mobile phone terminal. In this way, data transfer can be performed from the old mobile phone terminal to the new mobile phone terminal.

The version of USB that is used for connection to a mobile phone terminal is version 1.1. Accordingly, in the method described in Japanese unexamined patent publication No. 2002-359694, a mobile phone terminal transfers data at a rate of approximately 1.5 Mbps (bit per second). However, since large size data is handled nowadays, in some cases, it may take much time to transfer data at this rate.

The USB 1.1 has a full-speed mode, i.e., a mode for transferring data at a rate of 12 Mbps. This mode, however, lacks stability compared to a low speed mode (a mode at a rate of 1.5 Mbps). Accordingly, in order to use the full-speed mode, error-handling logic such as retransmission control is necessary. It is difficult, however, to use the full-speed mode in mobile phone terminals on which strict conditions are imposed such as a small casing, a low cost and electric power saving. In short, it is desired that mobile phone terminals can achieve data transfer at a higher rate than ever before with the current specifications maintained as much as possible.

SUMMARY

The present disclosure is directed to solve the problems pointed out above, and therefore, an object of an embodiment of the present invention is, in a device such as a mobile phone terminal including an interface for a semiconductor memory, to transfer data in a stable manner at a higher rate than ever before with the current specifications of the device maintained.

A data input and output device according to one aspect of the present invention is a data input and output device for inputting data from a semiconductor memory associating device or outputting data thereto. The semiconductor memory associating device has a mounting portion that mounts a predetermined standard semiconductor memory and has a function of writing data to the semiconductor memory or of reading data from the semiconductor memory. The data input and output device includes a data input and output device body, and a connector that is to be mounted to the mounting portion of the semiconductor memory associating device. The data input and output device body has a semiconductor memory simulation portion that simulates a storage area of the semiconductor memory in a storage medium having a capacity larger than that of the semiconductor memory, a data write portion that writes data in a virtual storage area that is the storage area of the semiconductor memory simulated by the semiconductor memory simulation portion, the data being sent from the semiconductor memory associating device via the connector, and a data transmission portion that sends data stored in the virtual storage area to the semiconductor memory associating device via the connector.

The structure described above enables, in a device such as a mobile phone terminal including an interface for a semiconductor memory, data transfer in a stable manner at a higher rate than ever before with the current specifications of the device maintained.

These and other characteristics and objects of the present invention will become more apparent by the following descriptions of preferred embodiments with reference to drawings.

BRIEF DESCRIPTION OF THE DRAWINGS

FIG. 5 is a diagram showing functions of terminals based on a miniSD standard.

FIG. 8 shows an example of an address book format table.

DESCRIPTION OF THE PREFERRED EMBODIMENTS

Figure 1:
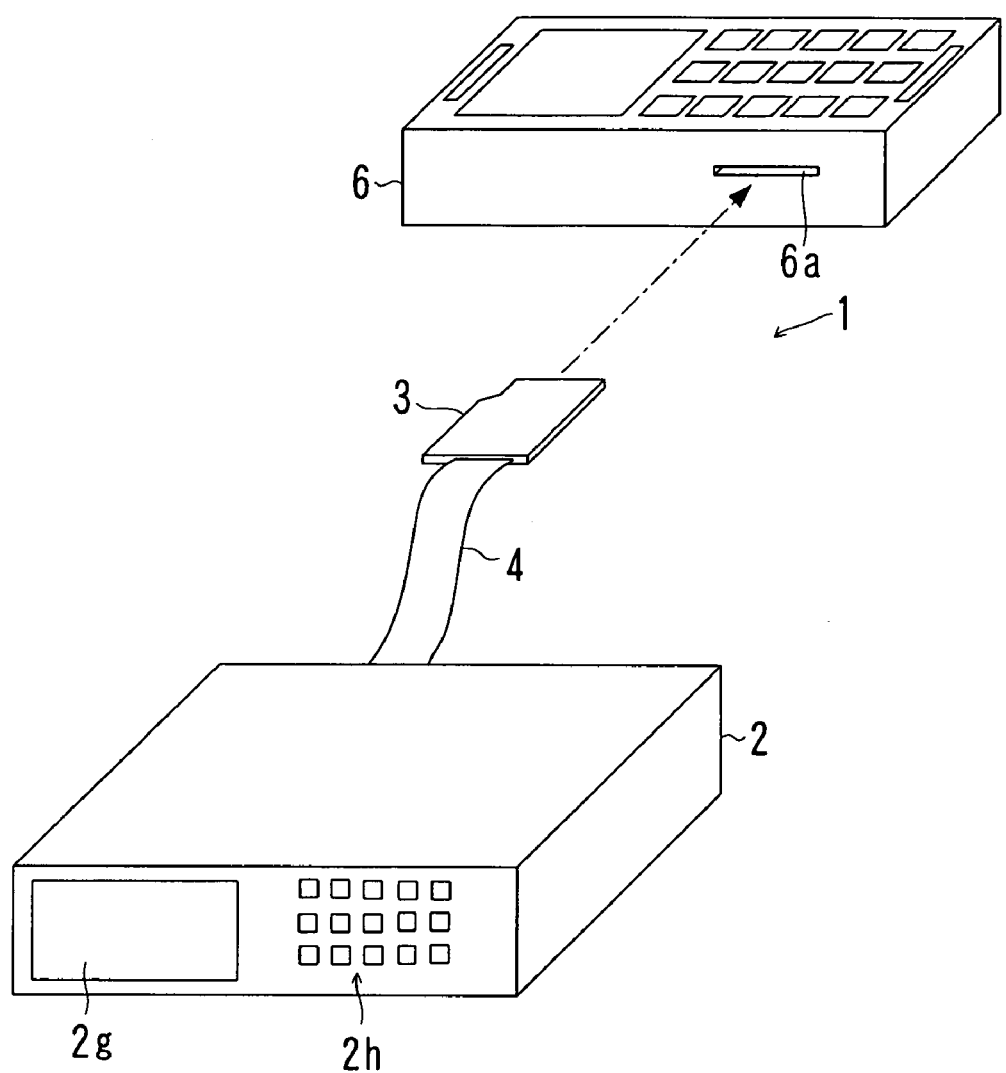
FIG. 1 is a diagram showing the entire structure of a data management device.

Referring to FIGS. 1-8, the entire structure of a data management device 1, an example of a structure of a miniSD connector 3, an example of a circuit configuration of the miniSD connector 3 and a cable 4, an example of a printed circuit board used in conventional miniSD, functions of terminals 32b based on a miniSD standard, an example of a hardware configuration of a data management device body 2, an example of a functional configuration of the data management device body 2, and an example of an address book format table TB are described.

As shown in FIG. 1, the data management device 1 according to an embodiment of the present invention includes the data management device body 2, the miniSD connector 3, and the cable 4.

The data management device 1 is used for backup and management of data that is used in a device including an interface for a card type semiconductor memory or a stick type semiconductor memory. Such a device is, for example, a mobile phone terminal, a printer, a scanner, a digital camera or a digital audio player. Alternatively, the data management device 1 is used for transferring data that was backed up to other device. The following is a description of a case in which the data management device 1 manages data of a mobile phone terminal 6 having an interface for miniSD that is a standard advocated by SD card association (SDA), an address book (a phone book) function, and a camera function.

The miniSD connector 3 and the cable 4 connect the data management device body 2 and the mobile phone terminal 6 electrically and function as a path for electronic data (hereinafter refer to as "data" simply) exchanged therebetween. In the case where the data management device body 2 and the mobile phone terminal 6 are to be connected to each other, the miniSD connector 3 is inserted into a miniSD slot 6a provided in the mobile phone terminal 6. In the case where the data management device body 2 and the mobile phone terminal 6 are to be disconnected from each other, the miniSD connector 3 is removed from the slot 6a. Data outputted from the mobile phone terminal 6 is inputted to the data management device body 2 via the miniSD connector 3 and the cable 4 in this order. In contrast, data outputted from the data management device body 2 is inputted to the mobile phone terminal 6 via the cable 4 and the miniSD connector 3 in this order.

Figure 2:
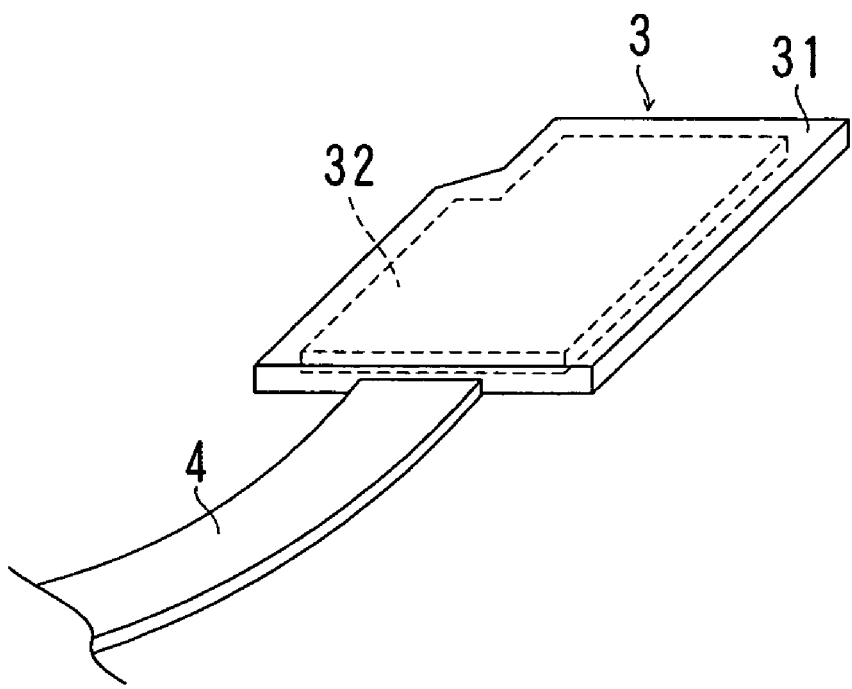
FIG. 2 is a diagram showing an example of a structure of a miniSD connector.

Referring to FIG. 2, the miniSD connector 3 includes a casing 31 and a printed circuit board 32.

Figure 3:
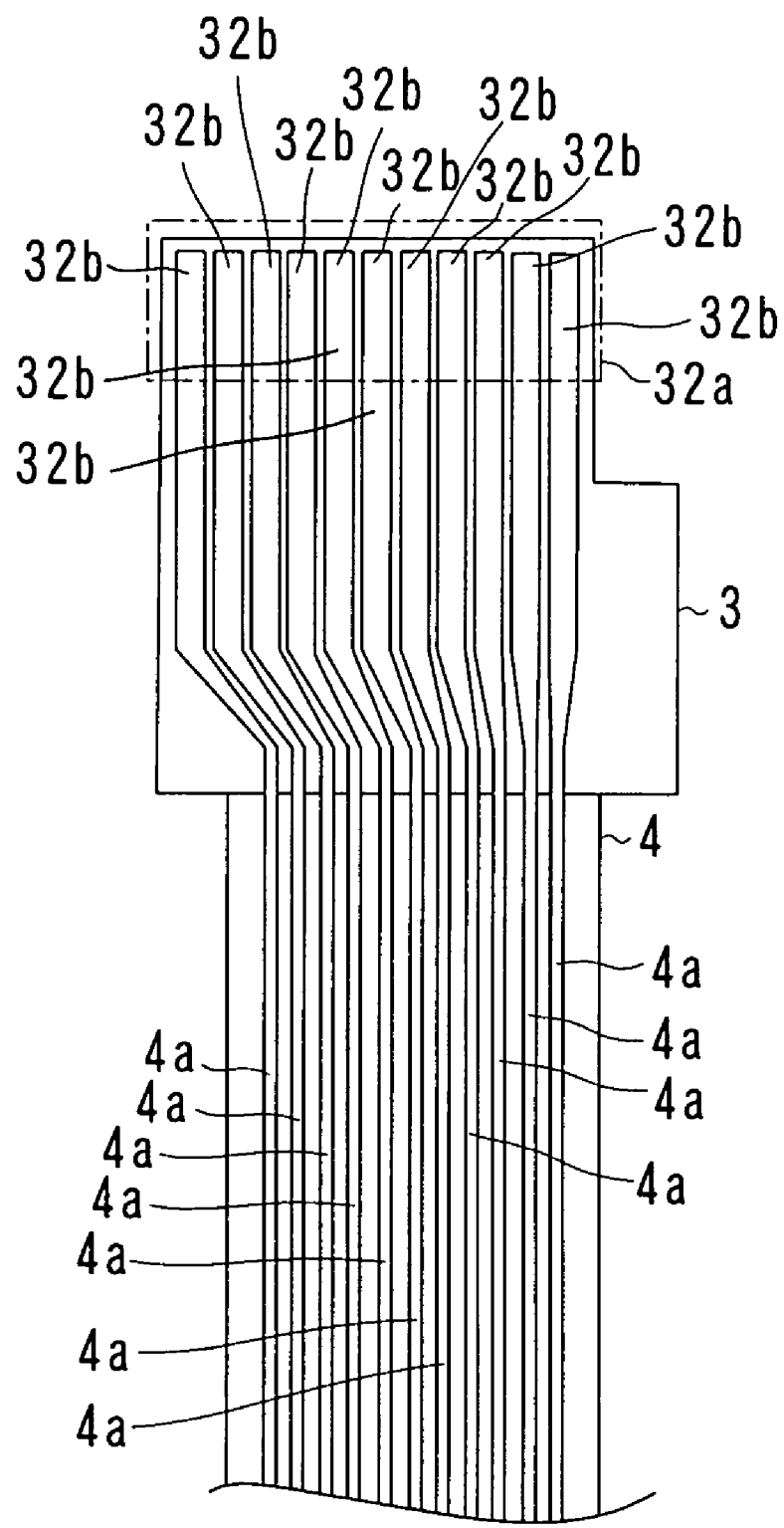
FIG. 3 is a diagram showing an example of a circuit configuration of the miniSD connector and a cable.
Figure 4A:
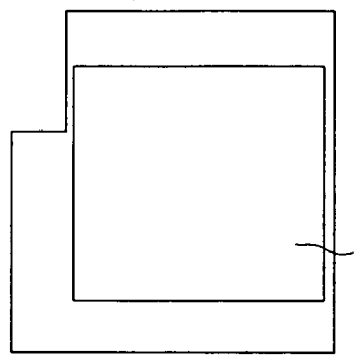
FIGS. 4A and 4B show an example of a printed circuit board used in conventional miniSD.
Figure 4B:
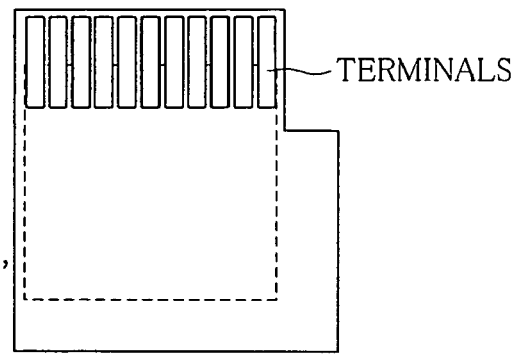

The printed circuit board 32 has almost the same shape and size as a printed circuit board included in the miniSD. The printed circuit board 32 is housed in the casing 31. As shown in FIG. 3, the rear surface of the printed circuit board 32 has eleven terminals (terminal pads or pins) 32b at a portion (hereinafter referred to as a "connection portion 32a") to be connected to terminals on the mobile phone terminal 6 side, as with an array of eleven terminals in the printed circuit board of the miniSD (see FIG. 4B). As to the printed circuit board of the miniSD, as shown in FIG. 4B, the eleven terminals do not extend beyond a device made up of, for example, a system LSI and a flash memory. In contrast, the terminals 32b of the printed circuit board 32 are elongated in order to connect to the cable 4.

The casing 31 has almost the same shape and dimensions as a casing of the miniSD. The casing 31 has an opening in a surface to which the connection portion 32a faces in the case where the casing 31 houses the printed circuit board 32. Thereby, when the printed circuit board 32 is inserted into the slot 6a of the mobile phone terminal 6, the terminals 32b of the printed circuit board 32 come in contact with terminals in the slot 6a. The insertion direction into a device such as the mobile phone terminal 6 is the same as the case of the miniSD as indicated by the arrow in FIG. 1.

The cable 4 has signal lines 4a whose number is the same as the number of terminals of the miniSD, i.e., eleven signal lines 4a. A first end of each of the signal lines 4a is connected to any one of the terminals 32b in the printed circuit board 32 so that the first end and any one of the terminals 32b make one pair. Accordingly, the miniSD connector 3 and the cable 4 form eleven paths. A second end of each of the signal lines 4a is connected to the data management device body 2.

The eleven paths (the terminals 32b and the signal lines 4a) comply with the miniSD standard. As to the standard, a website should be referred to by typing the following URL: http://www.sdcard.com.

The function of each of the terminals 32b is as indicated in FIG. 5. Incidentally, the number of terminals of SD (standard SD) is nine. Referring to FIG. 5, nine of the eleven terminals 32b have pin numbers 1-9, respectively. Each of the nine terminals 32b having pin numbers 1-9 corresponds to any terminal (pin) of the standard SD. The remaining two terminals 32b are provided for expansion in the future and are not used at the present time.

Figure 6:
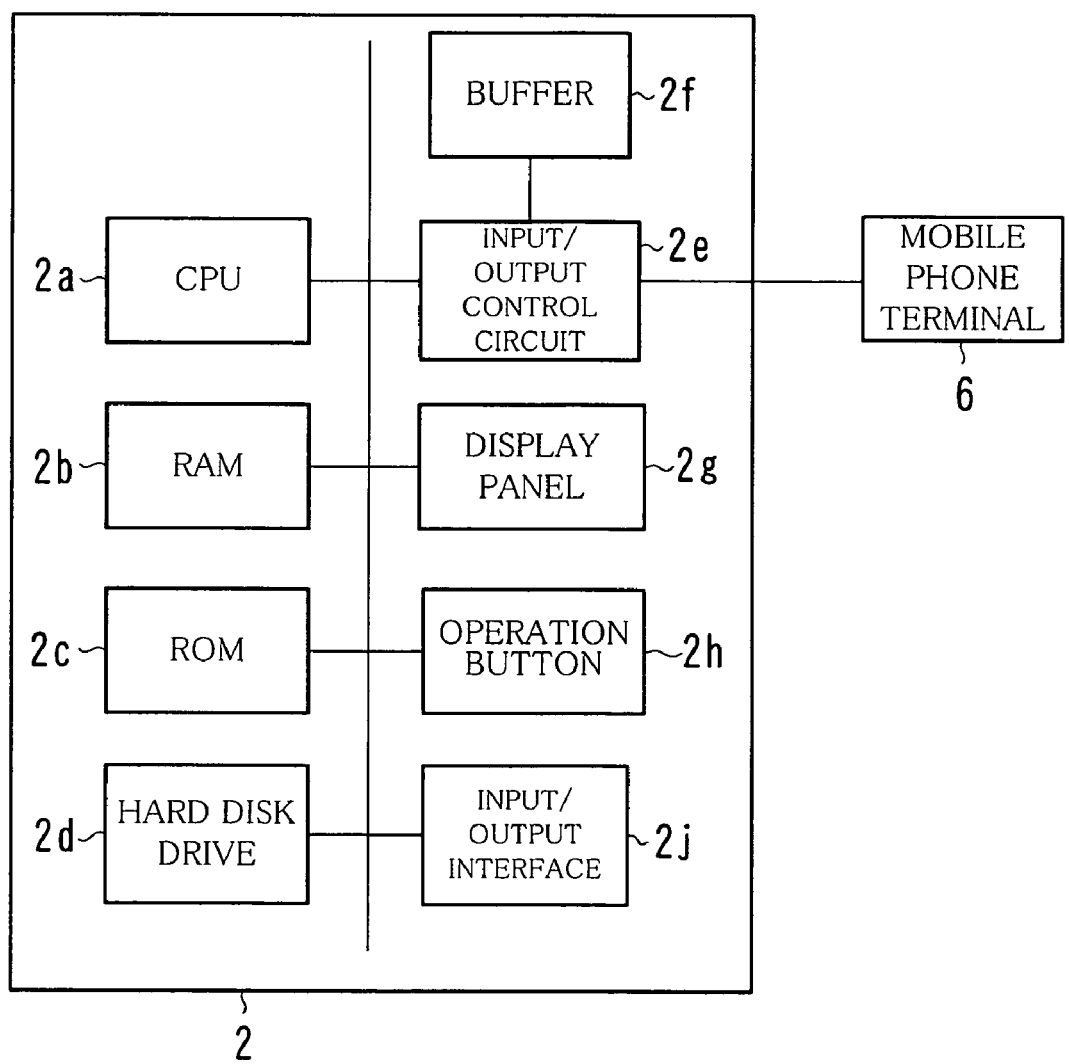
FIG. 6 is a diagram showing an example of a hardware configuration of a data management device body.

Referring to FIG. 6, the data management device body 2 includes a CPU 2a, a RAM 2b, a ROM 2c, a hard disk drive 2d, an input/output control circuit 2e, a buffer 2f, a display panel 2g, an operation button 2h and an input/output interface 2j.

The input/output control circuit 2e is connected to the signal lines 4a of the cable 4. The input/output control circuit 2e serves to emulate the system LSI of the miniSD and control data exchange with the mobile phone terminal 6.

The buffer 2f is a memory for temporarily storing data to be exchanged with the mobile phone terminal 6. In the cases where a storage medium such as the RAM 2b or the hard disk drive 2d reads and writes data at a high speed, where a data transfer rate is high between units in the data management device body 2, and where the CPU 2a has a high processing power, a configuration is possible in which data to be exchanged with the mobile phone terminal 6 is stored in the RAM 2b instead of being stored in the buffer 2f.

Figure 7:
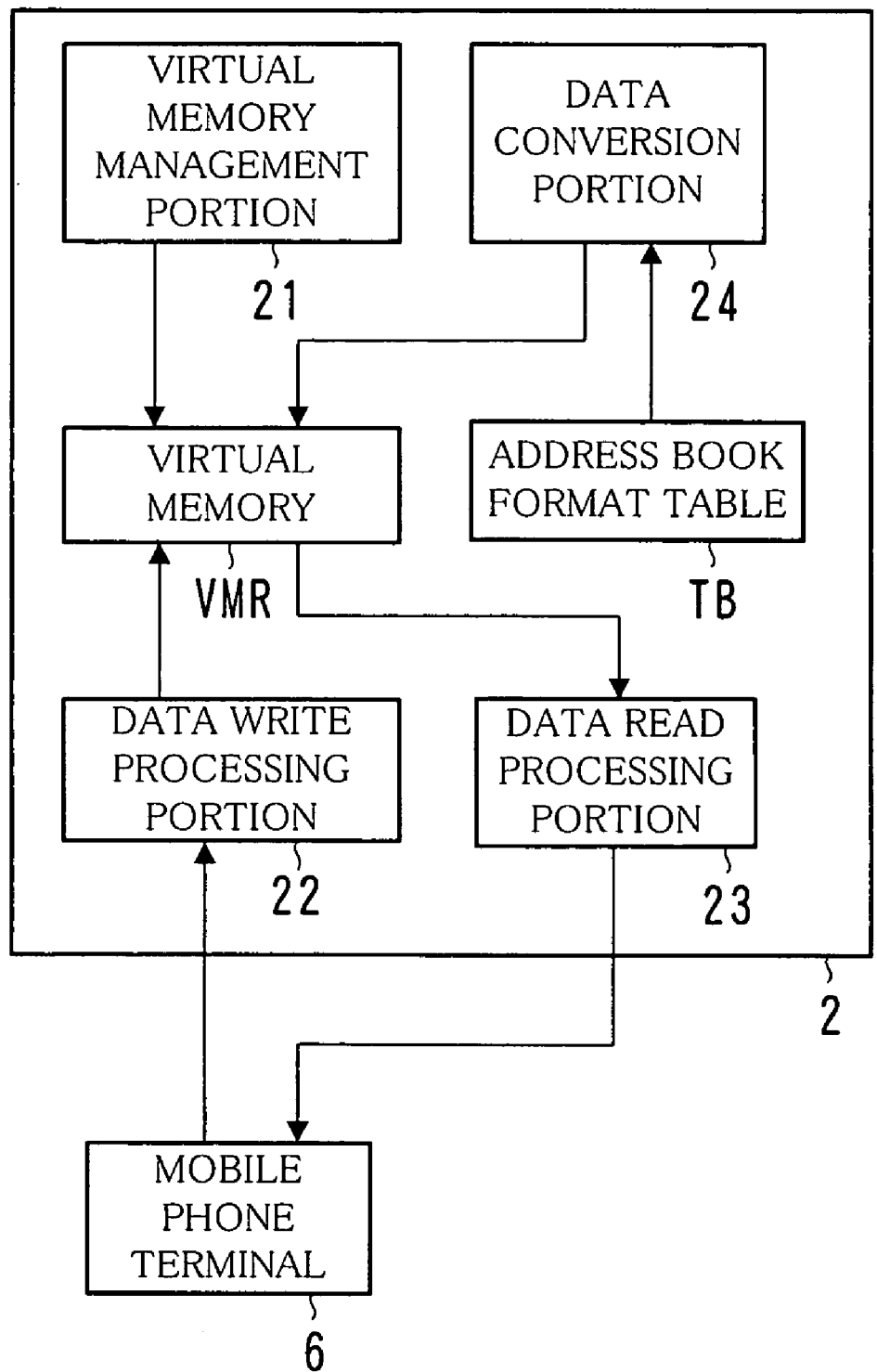
FIG. 7 is a diagram showing an example of a functional configuration of the data management device body.

Data management software is installed on the hard disk drive 2d. The data management software is software for managing data in the address book (phone book) of the mobile phone terminal 6, image data photographed by the mobile phone terminal 6 and other data. The data management software includes programs and data for implementing functions of a virtual memory management portion 21, a data write processing portion 22, a data read processing portion 23, a data conversion portion 24 and an address book format table TB, all of which are shown in FIG. 7. These programs and data constituting the data management software are loaded into the RAM 2b as necessary, and the programs are executed by the CPU 2a. The whole or a part of the virtual memory management portion 21, the data write processing portion 22, the data read processing portion 23, the data conversion portion 24 and the address book format table TB may be implemented not by software but by hardware such as a circuit.

Note that the hard disk 2d has a capacity much larger than that of the miniSD. It is desirable that the hard disk drive 2d has a free space larger than the capacity of the miniSD.

The address book format table TB is provided for each model of mobile phone terminal. As shown in FIG. 8, for example, the address book format table TB indicates an address book format of the corresponding model. Further, in the address book format table TB, the model is associated with identification information thereof, e.g., a manufacturer name and a model name.

The virtual memory management portion 21 performs processing for simulating miniSD in the data management device 1 to manage the simulated miniSD (hereinafter, referred to as a "virtual memory VMR"). Such processing is performed, for example, in the following manner.

The virtual memory management portion 21 reserves in the hard disk drive 2d a storage area having the same size (approximately one gigabyte) as a normal storage capacity of the miniSD and thereby provides a virtual memory VMR. The virtual memory VMR is given an address corresponding to a physical address of the miniSD, so that the mobile phone terminal 6 can recognize the virtual memory VMR as with the actual miniSD. In addition, identification information is added to the virtual memory VMR so that the virtual memory VMR is distinguished from other virtual memories VMR that are already provided in the hard disk drive 2d. This identification information may be added by a user or may be automatically issued by the virtual memory management portion 21.

While the miniSD connector 3 is inserted into the mobile phone terminal 6, in other words, while the data management device body 2 is connected to the mobile phone terminal 6, the virtual memory management portion 21 activates any one of the virtual memories VMR provided in the hard disk drive 2d.

In the case where the data write processing portion 22 detects from the data management device body 2 a data write signal (a command signal indicating to which address on a memory data should be written), the data write processing portion 22 writes data indicated in the data write signal into an address on the virtual memory VMR currently activated by the virtual memory management portion 21. The address corresponds to the data write signal. In the case where the data write processing portion 22 detects an initialization control signal, the data write processing portion 22 completely deletes the contents of the active virtual memory VMR. In the case where the data write processing portion 22 detects a copy control signal, the data write processing portion 22 duplicates data indicated in the control signal and writes the duplicated data in a free storage space of the active virtual memory VMR.

In the case where the data read processing portion 23 detects from the data management device body 2 a data read signal (a command signal indicating from which address on a memory data should be read out), the data read processing portion 23 reads data indicated in the data read signal from an address on the active virtual memory VMR. The address corresponds to the data read signal.

The data conversion portion 24 performs processing for converting data in the address book stored in the virtual memory VMR or data in the address book to be stored in the virtual memory VMR into data having a format corresponding to a manufacturer name and a model of a mobile phone terminal designated by a user. Such processing is performed, for example, in the following manner.

The data conversion portion 24 checks a structure of data in the address book to be converted, based on an address book format table TB corresponding to a manufacturer name and a model name of a mobile phone terminal 6 that is the transmission source of the data. Then, the data conversion portion 24 sorts the data on a field basis and changes the size of each field as necessary so that the data format is converted into a format (data structure) indicated in the address book format table TB corresponding to the manufacturer name and the model of the mobile phone terminal designated by the user. In this way, the data in the address book is converted.

Figure 9:
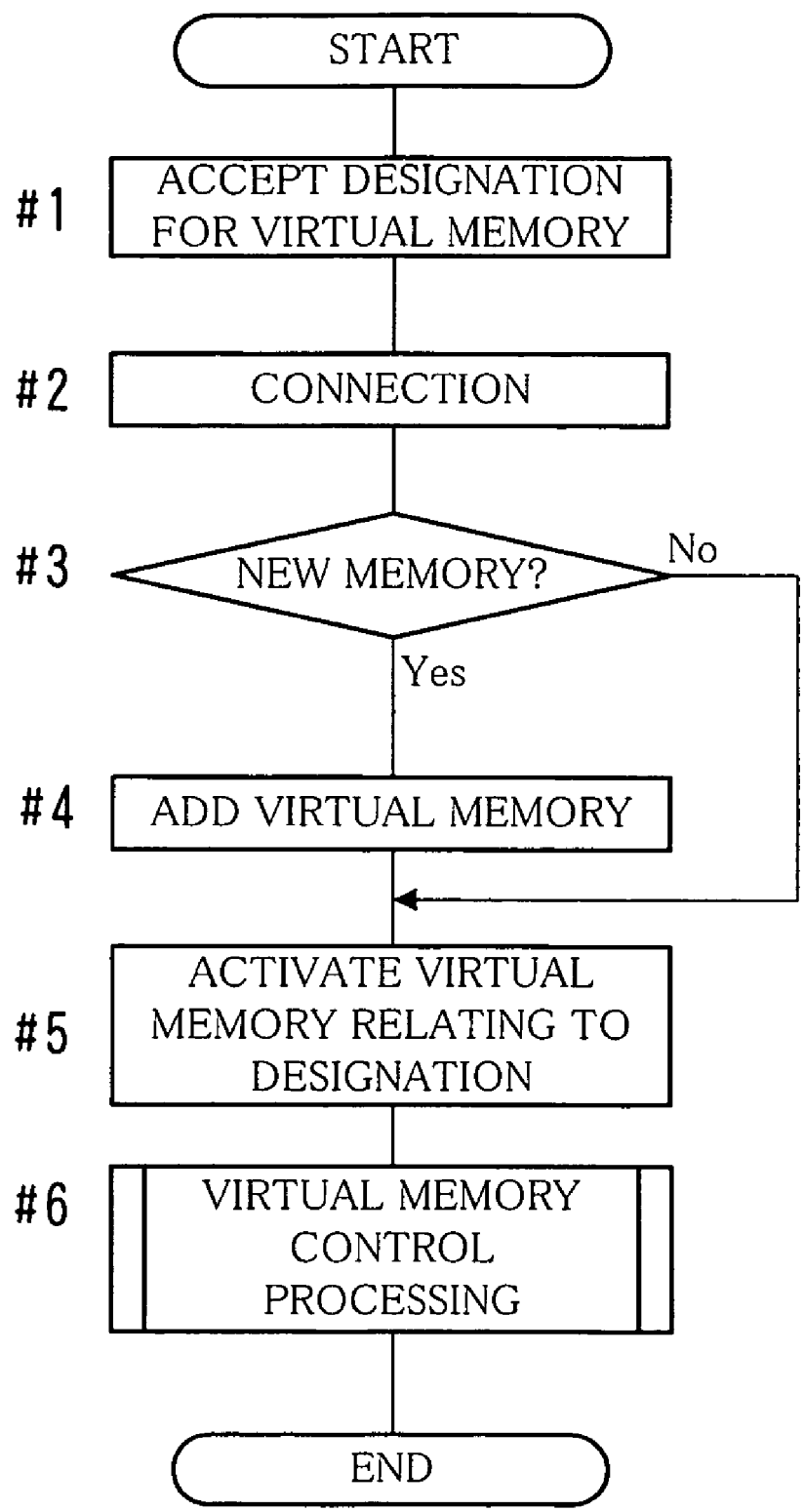
FIG. 9 is a flowchart showing an example of the entire processing flow of the data management device.
Figure 10:
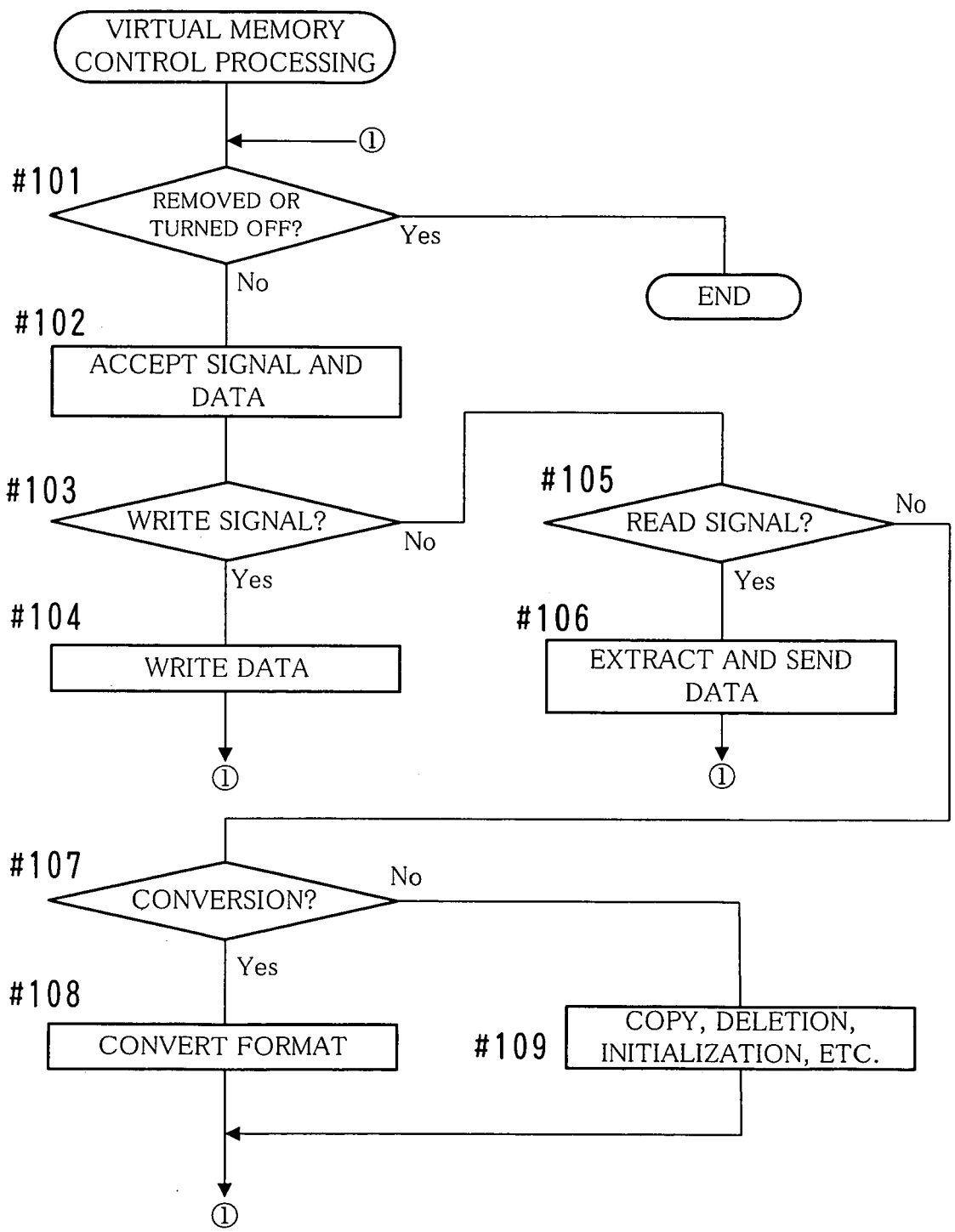
FIG. 10 is a flowchart showing an example of a processing flow for controlling a virtual memory.

FIG. 9 is a flowchart showing an example of the entire processing flow of the data management device 1, and FIG. 10 is a flowchart showing an example of a processing flow for controlling a virtual memory.

The following is a description, with reference to the flowcharts, of a processing flow for managing the virtual memory VMR in the data management device 1.

A user operates the operation button 2h of the data management device 1 to designate identification information of the virtual memory VMR to be used. Then, the user inserts the miniSD connector 3 of the data management device 1 into the mobile phone terminal 6 and turns on the power of the mobile phone terminal 6.

Responsive to this, as shown in FIG. 9, the data management device 1 accepts the designation for the virtual memory VMR (#1) and is connected to the mobile phone terminal 6 (#2). Then, the data management device 1 activates the virtual memory VMR relating to the designation (#5). On this occasion, the mobile phone terminal 6 understands as if miniSD simulated by the virtual memory VMR was inserted into the slot 6a.

When intending to simulate new miniSD, the user designates the new miniSD for the data management device 1. Responsive to this (Yes in #3), the data management device 1 reserves a storage area for a new virtual memory VMR in the hard disk drive 2d (#4) and activates the virtual memory VMR relating to the designation (#5). On this occasion, the mobile phone terminal 6 understands as if the new miniSD was inserted into the slot 6a.

Then, the data management device 1 performs processing as shown in FIG. 10 based on a control signal and data sent from the mobile phone terminal 6 (#6).

The user performs for the mobile phone terminal 6 the following operation, for example: operation for writing data of the address book or image data into the designated virtual memory VMR; operation for reading data from the virtual memory VMR; or operation for converting the data in the address book stored in the virtual memory VMR into data having a predetermined format. Responsive to this, the mobile phone terminal 6 delivers the control signal and data according to user's operation to the miniSD connector 3 inserted into the slot 6a.

The control signal and the data pass through the miniSD connector 3 and the cable 4, and then to be accepted by the data management device body 2 (#102).

If the accepted control signal is a write signal indicating that data should be written into the miniSD (Yes in #103), then the data management device 1 writes the accepted data into the virtual memory VMR that is currently active (#104). Differently, if the accepted control signal is a read signal indicating that data should be read from the virtual memory VMR (No in #103, Yes in #105), then the data management device 1 calls data indicated in the read signal from the virtual memory VMR and sends the same to the mobile phone terminal 6 (#106). Differently, if the accepted control signal is a conversion command signal indicating that an address book format should be converted (No in #103, No in #105, Yes in #107), then the data management device 1 calls data in the address book stored in the virtual memory VMR and converts the data into data having a format indicated in the conversion command signal (#108). Then, the data management device 1 stores the converted data in the virtual memory VMR again.

Other than those above, the data management device 1 appropriately performs processing for copying or deleting data stored in the virtual memory VMR, processing for initializing the virtual memory VMR, processing for updating the details of the address book, and other processing in accordance with the control signal sent from the mobile phone terminal 6 (#109). The processing from Step #102 through Step #109 is carried out appropriately until the miniSD connector 3 is removed from the mobile phone terminal 6, or until the data management device body 2 or the mobile phone terminal 6 is turned off.

This embodiment allows stable data transfer at a higher rate than ever before with the current specifications maintained without modifying mobile phone terminals including a read/write function from/to miniSD. More specifically, mobile phone terminals can perform data transfer only at a rate of 1.5 Mbps (bit per second) in serial communication using a conventional USB. According to the data management device 1 in this embodiment, however, mobile phone terminals can perform data transfer stably at a rate of approximately 6 MB/s (byte per second) using an interface for the existing miniSD.

Further, an interface for miniSD can be used to perform external communication, which eliminates the need for other interfaces that have been included and reduces the size, the price and the electrical power of mobile phone terminals.

The data management device 1 is installed in, for example, shops where mobile phone terminals are sold or service centers for end-user support, which is convenient for the existing users. In addition, the data management device 1 makes it possible to exchange data in an address book and others between mobile phone terminals regardless of differences in carrier. Accordingly, mobile phone companies install the data management device 1 in, for example, shops or service centers, and thereby the mobile phone companies can actively prompt users who use competitors' mobile phone terminals to replace competitors' mobile phone terminals with their own mobile phone terminals.

The data management device 1 can be used also in order to exchange data between two of the mobile phone terminals 6. For example, in the case where data transmission is desired from the mobile phone terminal 61 to the mobile phone terminal 62, the data management device 1 is used as follows. A user designates a virtual memory VMR to be used for the data management device 1, inserts the miniSD connector 3 of the data management device 1 into the slot 6a of the mobile phone terminal 61, and turns on the mobile phone terminal 61. Then, the user performs for the mobile phone terminal 61 the same operation as in the case of writing data into conventional miniSD. Responsive to this, the mobile phone terminal 61 delivers a write signal and data to the medium (in this case, the miniSD connector 3) inserted into the slot 6a in the same manner as before. Then, the data management device body 2 receives the write signal and the data to write the data into the virtual memory VMR.

The user removes the miniSD connector 3 from the slot 6a of the mobile phone terminal 61, then inserts the miniSD connector 3 into the slot 6a of the mobile phone terminal 62, and turns on the mobile phone terminal 62. Then, the user performs for the mobile phone terminal 62 the same operation as in the case of reading out data from conventional miniSD. Responsive to this, the mobile phone terminal 62 attempts to read data from the medium (in this case, the miniSD connector 3) inserted into the slot 6a in the same manner as before. Then, the data management device body 2 calls the data from the virtual memory VMR and sends the called data to the mobile phone terminal 62. In this way, data can be sent from the mobile phone terminal 61 to the mobile phone terminal 62.

In this embodiment, one set of the miniSD connector 3 and the cable 4 is provided. Instead, however, two or more sets of the miniSD connector 3 and the cable 4 can be provided. Then, a configuration is possible in which two or more of the mobile phone terminals 6 can exchange data smoothly without sharing one miniSD connector 3 as described above.

The data management device body 2 can be structured using a device such as a personal computer or a workstation. In such a case, for example, it is preferable that a PC card is prepared which includes a circuit corresponding to the input/output control circuit 2e and is connected to the miniSD connector 3 via the cable 4. Then, it is preferable that the PC card is inserted into a personal computer or the like, the miniSD connector 3 is inserted into the mobile phone terminal 6, and thereby the personal computer and the mobile phone terminal 6 are interconnected.

In this embodiment, descriptions are provided of the case where a format conversion process is performed on data in an address book. Instead, a configuration is possible in which the data management device body 2 performs a format conversion process on multimedia data such as image data or music data.

In this embodiment, descriptions are provided of the case where miniSD is used as a semiconductor memory. Instead, other standard semiconductor memory may be used. The present invention can be applied to, for example, SD of SD card association, Memory Stick or Memory Stick DUO of Sony Corporation, CompactFlash of SanDisk Corporation, or SmartMedia of SmartMedia forum.

The overall configuration of the data management device 1, the data management device body 2, the configurations of various portions thereof, the details of processing, the processing order, the structures of table and the like may be changed as needed, in accordance with the subject matter of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A data input and output device for inputting data from a semiconductor memory associating device or outputting data thereto, the semiconductor memory associating device including a mounting portion that mounts a predetermined standard semiconductor memory and including a function of writing data to the semiconductor memory or of reading data from the semiconductor memory, the data input and output device comprising:

a data input and output device body; and a connector that is to be mounted to the mounting portion of the semiconductor memory associating device, the data input and output device body including a semiconductor memory simulation portion that simulates a storage area of the semiconductor memory in a storage medium having a capacity larger than that of the semiconductor memory, a data write portion that writes data in a virtual storage area that is the storage area of the semiconductor memory simulated by the semiconductor memory simulation portion, the data being sent from the semiconductor memory associating device via the connector, and a data transmission portion that sends data stored in the virtual storage area to the semiconductor memory associating device via the connector.

2. The data input and output device according to claim 1, wherein the data input and output device body further includes a data conversion portion that converts data sent from the semiconductor memory associating device into data having a different format.

3. The data input and output device according to claim 2, wherein the data conversion portion converts data in an address book sent from the semiconductor memory associating device into data having a format corresponding to a model other than a model of the semiconductor memory associating device.

4. A data input and output method for inputting data from a semiconductor memory associating device or outputting data thereto, the semiconductor memory associating device including a mounting portion that mounts a predetermined standard semiconductor memory and a function of writing data to the semiconductor memory or of reading data from the semiconductor memory, the data input and output method comprising:
   providing a connector that is mountable to the mounting portion of the semiconductor memory associating device in a data management device that has a function of writing data to a storage medium having a capacity larger than that of the semiconductor memory or of reading data from the storage medium;
   performing, by the data management device, processing for simulating a storage area of the semiconductor memory in the storage medium;
   when data is sent from the semiconductor memory associating device via the connector, performing, by the data management device, processing for writing the data in a virtual storage area that is the simulated storage area of the semiconductor memory; and
   when data is requested by the semiconductor memory associating device, performing, by the data management device, processing for sending the data stored in the virtual storage area to the semiconductor memory associating device via the connector.

5. A data transfer method comprising:
   connecting the data input and output device according to claim 1 to a first semiconductor memory associating device with the connector;
   writing data to the virtual storage area, the data being outputted from the first semiconductor memory associating device to the connector;
   connecting the data input and output device to a second semiconductor memory associating device with the connector; and
   sending the data written to the virtual storage area to the second semiconductor memory associating device via the connector.

6. A computer program product for use in a computer for inputting data from a semiconductor memory associating device or outputting data thereto, the semiconductor memory associating device including a mounting portion that mounts a predetermined standard semiconductor memory and a function of writing data to the semiconductor memory or of reading data from the semiconductor memory, the computer being connected to the semiconductor memory associating device via the mounting portion, the computer program product letting the computer execute the processes comprising:
   simulating a storage area of the semiconductor memory in a storage medium provided in the computer;
   when data is sent from the semiconductor memory associating device, writing the data in a virtual storage area that is the simulated storage area of the semiconductor memory; and
   when data is requested by the semiconductor memory associating device, sending the data stored in the virtual storage area to the semiconductor memory associating device.

* * * * *